United States Patent [19]

Kubota

[11] 4,380,026

[45] Apr. 12, 1983

[54] METHOD FOR FLASHING A STROBOSCOPE FOR USE WITH JUDGING THE GOOD OR BAD OF AN OBJECT TO BE INSPECTED

[75] Inventor: Yutaka Kubota, Odawara, Japan

[73] Assignee: Stanley Electric Co. Ltd., Tokyo, Japan

[21] Appl. No.: 215,138

[22] Filed: Dec. 10, 1980

[30] Foreign Application Priority Data

Dec. 12, 1979 [JP] Japan .................................. 54-161148

[51] Int. Cl.³ .............................................. H04N 7/18
[52] U.S. Cl. ..................................... 358/106; 356/23; 358/101
[58] Field of Search ............... 358/101, 106, 107, 108, 358/93; 356/23

[56] References Cited

U.S. PATENT DOCUMENTS

| | | | |
|---|---|---|---|
| 2,798,605 | 7/1957 | Richards | 358/106 |
| 4,118,732 | 10/1978 | Ichijima | 358/106 |
| 4,240,110 | 12/1980 | Henry | 358/107 |
| 4,305,658 | 12/1981 | Yoshida | 358/106 |
| 4,318,081 | 3/1982 | Yoshida | 358/107 |
| 4,319,269 | 3/1982 | Kajiura | 358/106 |

FOREIGN PATENT DOCUMENTS 52-65613   5/1977   Japan .................................. 358/106

*Primary Examiner*—Howard Britton
*Attorney, Agent, or Firm*—Murray Schaffer

[57] ABSTRACT

An object is picked-up by a television camera and a video signal thereof is produced. A stroboscope flash radiates the object with the light therefrom, detecting the object arriving at a predetermined detecting position and producing a position detecting signal. A synchronizing signal is separated from the video signal, and a signal for flashing the stroboscope is generated when both of the position detecting signal and the synchronizing signal exist, so that the video signal of the object is delivered from the television camera at the beginning of the scanning thereof.

1 Claim, 6 Drawing Figures

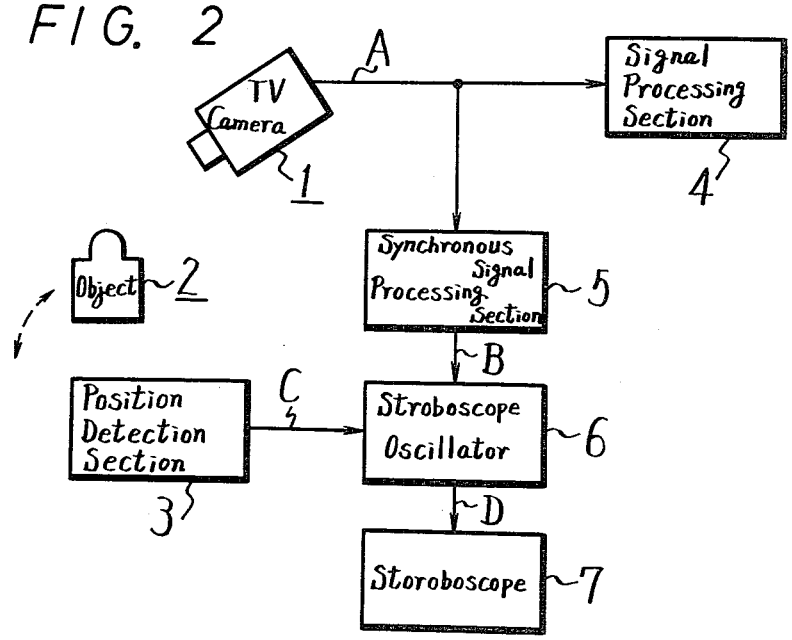

METHOD FOR FLASHING A STROBOSCOPE FOR USE WITH JUDGING THE GOOD OR BAD OF AN OBJECT TO BE INSPECTED

BACKGROUND OF THE INVENTION

1. Field of the Invention

The present invention relates to a method, an object moving on a carrier such as a belt conveyer is photosensed as a static image by a television camera upon the flash of a stroboscope. The video or image signal delivered from the television camera is used to judge the good or bad of the object. The stroboscope flash timing is synchronized with the vertical synchronizing signal of the image signal from the camera.

2. Description of the Prior Art

Systems that judge the good or bad of an inspected object by shape irregularities are known as pattern recognition systems. Such systems are mainly used to segregate defective objects which produce irregular shape or pattern among the many similar shaped objects by a manner that, for instance, such objects, which are transferred on belt conveyors or the like, are picked up by a television camera in the same direction and are taken as a static image by utilizing a stroboscope flash on the object, whereas such image signal from the television camera is processed to provide the above mentioned judgement.

FIG. 1 illustrates such a conventional system by block diagram, wherein a is a moving object, and the system comprises by a television camera b which photosenses the object a, a monitor or a signal processing section c, a stroboscope section or lamp d that is used to secure a static image of the moving object a for camera b, and an oscillator e to flash the stroboscope lamp d, by which the consecutively moving objects a are photosensed by camera b to produce a video or image signal which is processed at the monitor or the signal processing section c. However, in the illustrated conventional system, since the system does not contain any means for synchronizing the stroboscope flash timing with the television camera in spite of the fact that it is used to obtain a static image of the object a, it is difficult to take a matched timing for the image signal processing. For instance, when the stroboscope lamp d flashes on the way during the horizontal scanning of the television camera b, if the horizontal scanning is about around the midway of one field, the lower half image signal of object a is the first output from camera b, which is then followed by a second image signal by the upper horizontal scanning. Accordingly, some methods or means are necessary to recognize that these 2 image signals express one object a. To this end, for instance, a stroboscope flash timing control circuitry or the like becomes necessary and hence the stroboscope system becomes extremely complicated.

OBJECTS AND SUMMARY OF THE INVENTION

Accordingly, it is an object of the present invention to provide a novel method for flashing a stroboscope for use with judging the good or bad of an object to be inspected by using a television camera.

According to the present invention, such a method is provided which is capable of image signal processing without having a special timing circuitry, and in order to accomplish such purpose, the stroboscope flashes in synchronism vertical synchronizing signal of the television camera.

According to an aspect of the present invention, method for flashing a stroboscope for use with judging the good or bad of an object to be inspected is provided which comprises the steps of:

(a) picking up an object by a television camera and producing a video signal thereof;
(b) flashing a stroboscope to radiate said object with light therefrom;
(c) detecting said object arriving at a predetermined detecting position and producing a position detecting signal;
(d) separating a synchronizing signal from said video signal;
(e) generating a signal for flashing said stroboscope when both of said position detecting signal and said synchronizing signal exist, whereby the video signal of said object is delivered from said television camera at the beginning of the scanning thereof.

The additional objects, features and advantages of the present invention will become apparent from the following description taken in conjunction with the accompanying drawings.

BRIEF DESCRIPTION OF THE DRAWINGS

FIG. 1 is a block diagram showing one conventional system;

FIG. 2 is a block diagram to explain this invention; and

FIGS. 3A to 3D are each a time chart of the main parts of FIG. 2.

DESCRIPTION OF THE PREFERRED EMBODIMENT

Details of an example of the present invention will be explained hereunder in reference with the drawings. FIG. 2 is a block diagram used to explain an example of the present invention, in which 1 is a television camera for picking up or photosensing an object 2 to be inspected which is transported on, for example, belt conveyor. A position detection section 3 which is formed of, for example, as well known, a light source such as a light emission diode, a light receiving element such as Cds and a one-shot multivibrator is provided to produce an output comprising a detection signal when the object 2 has arrived at a predetermined detecting position. A signal processing section 4 such as a computer receives the video or image signal of the object 2 from television camera 1 and processes the same, 5 is a synchronizing signal processing section 5 is provided in which the vertical synchronizing signal in the image signal from the television camera 1 is separated. A stroboscope oscillator generates a signal to flash the stroboscope 7 as the start timing by obtaining the logics of the position detection signal from position detection section 3 as well as the vertical synchronizing signal from the synchronous processing system 5.

Such above function of the example of the invention shown in FIG. 2 will be explained with reference to the time chart as on FIG. 3. In other words, when object 2 to be judged arrives at a predetermined detecting position at a time $t_1$, it is detected by the position detection section 3 which then produces a position detecting signal C having an ON period W at least longer than the period between the adjacent vertical synchronizing signals B of the image signal as shown in FIG. 3C. On the other hand, from a composite video or image signal A shown in FIG. 3A generated by television camera 1, a vertical synchronizing signal B shown in FIG. 3B in this example is separated by the synchronous signal processing section 5. When the vertical synchronizing signal B as well as the position signal C are both presented, the stroboscope oscillator 6 generates a trigger signal D as shown in FIG. 3D. This trigger signal D is fed to stroboscope 7 in order to flash it.

When stroboscope 7 is flashed by obtaining the logical output of the position detection signal C, which indicates that object 2 arrived at the predetermined detecting position, and the synchronizing signal B in the image signal A from the television camera 1 is also obtained, a video or image signal X of the object 2 is superimposed on the video signal A from the television camera 1 as shown in FIG. 3A which is sent to the signal processing section 4. In this case, this image signal X is assured to represent the object from the beginning of one scanning, in other words, one entire field. Accordingly, the timing for the signal processing in the section 4 would be sufficient if it is synchronized with the vertical synchronizing signal B and a special timing circuitry is not necessary contrary to the conventional system.

As will be apparent from the above description of one example of the present invention, according to the invention, it is obvious that since the system of the invention obtains the image signal of the object by flashing the stroboscope in synchronization with the vertical synchronizing signal of the television camera, the process timing for the image signal, for instance, to conduct judgement of object shape irregularities can be synchronized with the vertical synchronizing signal. In this case, no addition of any special timing circuitry is required. Accordingly, by this invention the signal processing can be accomplished without complicating the construction of the signal processing section. Especially, when this invention is used for the purpose as a judgement system to determine whether the shape of object 2 is normal or not by the image signal of object 2, the signal processing section 4 is supplied with the image signal of a reference object and compares it with the image signal from the camera 1 in synchronism with the vertical synchronizing signal, for which any special timing circuitry is not necessary to make the judgement. Thus, the invention can perform such an effect that the conventional system construction can be extremely simplified.

It will be apparent that many modifications and variations could be effected by one skilled in the art without departing from the spirits or scope of the novel concepts of the present invention.

What is claimed is:

1. A method for flashing a stroboscope for use with judging the good or bad of an object to be inspected comprising the steps of:
    (a) picking up an object by a television camera and producing a video signal thereof;
    (b) providing a stroboscope for irradiation of said object with light therefrom;
    (c) separating a vertical synchronizing signal from said video signal;
    (d) detecting said object arriving at a predetermined detecting position and producing a position detecting signal, having an ON signal period longer than the period between adjacent vertical synchronizing signals;
    (e) generating a signal for flashing said stroboscope when both of said position detecting signal and said vertical synchronizing signal exist, whereby the video signal of said object is delivered from said television camera at the beginning of the scanning thereof.

* * * * *

UNITED STATES PATENT AND TRADEMARK OFFICE
CERTIFICATE OF CORRECTION

PATENT NO. : 4,380,026
DATED : April 12, 1983
INVENTOR(S) : Yutaka KUBOTA

It is certified that error appears in the above-identified patent and that said Letters Patent are hereby corrected as shown below:

page 1, item [73] Assignee: should list two names

--Stanley Electric Co. Ltd., Tokyo, Japan, and

Hajime Industries Ltd., Tokyo, Japan--

Signed and Sealed this

Tenth Day of January 1984

[SEAL]

*Attest:*

*Attesting Officer*

GERALD J. MOSSINGHOFF

*Commissioner of Patents and Trademarks*